(12) United States Patent
Roth et al.

(10) Patent No.: US 10,020,830 B2
(45) Date of Patent: Jul. 10, 2018

(54) MEASURING SYSTEM AND MEASURING METHOD FOR MEASURING AMPLIFICATION AND NOISE BY CORRELATION

(71) Applicant: Rohde & Schwarz GmbH & Co. KG, Munich (DE)

(72) Inventors: Alexander Roth, Dorfen (DE); Wolfgang Wendler, Groebenzell (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 35 days.

(21) Appl. No.: 15/160,004

(22) Filed: May 20, 2016

(65) Prior Publication Data

US 2017/0077971 A1    Mar. 16, 2017

Related U.S. Application Data

(60) Provisional application No. 62/217,800, filed on Sep. 11, 2015.

(51) Int. Cl.
| | |
|---|---|
| *H04B 17/00* | (2015.01) |
| *H04B 1/10* | (2006.01) |
| *H04B 17/336* | (2015.01) |
| *H04B 17/345* | (2015.01) |

(52) U.S. Cl.
CPC ....... *H04B 1/1027* (2013.01); *H04B 17/0085* (2013.01); *H04B 17/336* (2015.01); *H04B 17/345* (2015.01)

(58) Field of Classification Search
CPC .... G01R 29/26; G01R 19/0053; G01R 23/20; G01R 27/32; G01R 31/2616; G01R 31/2626; G01R 31/2646
USPC ...................................................... 455/226.3
See application file for complete search history.

(56) References Cited

U.S. PATENT DOCUMENTS

| | | | | |
|---|---|---|---|---|
| 5,416,422 A | * | 5/1995 | Dildine | G01R 29/26 324/613 |
| 6,529,719 B1 | * | 3/2003 | Imbornone | H03D 7/1433 455/302 |
| 8,711,992 B2 | | 4/2014 | Harada et al. | |
| 2005/0137814 A1 | | 6/2005 | Kelly et al. | |
| 2010/0013455 A1 | * | 1/2010 | Kelma | G01R 31/2822 324/76.12 |

(Continued)

*Primary Examiner* — Ajibola Akinyemi
(74) *Attorney, Agent, or Firm* — Potomac Technology Law, LLC

(57) ABSTRACT

A measuring system comprises a noise source adapted to provide a noise signal to a device under test. Moreover, it comprises a measuring device adapt to measure a measuring signal generated by the device under test in reaction to the noise signal. The measuring device further comprises a signal splitter adapted to split the measuring signal into at least a first split measuring signal and a second split measuring signal. Moreover it comprises a correlator adapted to correlate a signal derived from the first split measuring signal and a signal derived from the second split measuring signal. Also the measuring device comprises a processor adapted to determine an amplification factor and/or a noise figure of the device under test based upon the correlated signal derived from the first split measuring signal and signal derived from the second split measuring signal.

18 Claims, 2 Drawing Sheets

(56) References Cited

U.S. PATENT DOCUMENTS

2013/0018613 A1* 1/2013 Chow .................... G01R 29/26
702/69

* cited by examiner

MEASURING SYSTEM AND MEASURING METHOD FOR MEASURING AMPLIFICATION AND NOISE BY CORRELATION

RELATED APPLICATIONS

This application claims the benefit of the earlier filing date under 35 U.S.C. § 119(e) of U.S. Provisional Application Ser. No. 62/217,800 (filed 2015 Sep. 11).

FIELD

The invention relates to a measuring system and method for measuring the amplification and noise figure of a device under test.

BACKGROUND

Spectrum analyzers can be used for determining a noise figure of components like amplifiers or mixers. A known method for determining the noise figure is the so called Y-method, which is for example shown in the document US 2005/0137814 A1. This method comprises connecting a diode, such as an Enhanced Noise Ratio diode (ENR-diode) to the device under test (DUT) and successively switching between a regular noise signal and an enhanced noise signal. The spectrum analyzer then measures the noise power level in both situations and can determine the noise figure and the amplification factor of the DUT therefrom. The accuracy of the measuring system though is strongly influenced by a noise figure of the employed measuring device (e.g., the employed spectrum analyzer). For reducing the noise figure of the measuring device, it is suggested to use a low noise pre-amplifier (LNA). It is thereby possible to significantly reduce the noise figure of the measuring system. This, however, also leads to a reduction of the available dynamic range. Especially in broadband applications, it is possible to overpower the first stage of the analyzer with the power of the pre-amplified measuring signal.

What is needed, therefore, is a measuring system and measuring method that allow for a very accurate measurement of the noise figure and amplification of a device under test, independent of the power of the measuring signal.

SOME EXAMPLE EMBODIMENTS

Embodiments of the present invention advantageously address the foregoing requirements and needs, as well as others, by providing a measuring system and measuring method that allow for a very accurate measurement of the noise figure and amplification of a device under test, independent of the power of the measuring signal.

In accordance with example embodiments, a measuring system comprises a noise source configured to provide a noise signal to a device under test, and a measuring device configured to measure a measuring signal generated by the device under test in response to the noise signal. The measuring device comprises a signal splitter configured to split the measuring signal into at least a first split measuring signal and a second split measuring signal. The measuring device further comprises a correlator configured to correlate a signal derived from the first split measuring signal and a signal derived from the second split measuring signal. The measuring device further comprises a processor configured to determine one or more of an amplification factor and a noise figure of the device under test based on the correlated signal derived from the first split measuring signal and derived from the second split measuring signal. It is thereby possible to significantly reduce the noise generated by the measuring setup.

According to a further embodiment, the measuring device further comprises a controller configured to control a noise temperature of the noise signal generated by the noise source. By way of example, the noise source comprises a diode, such as an ENR-diode. It is thereby very easily possible to set the desired noise level of the noise source.

According to a further embodiment, the measuring system is configured to measure the one or more of the amplification factor and the noise figure of the device under test based on a Y-method. It is thereby possible to perform the measurements with minimal hardware effort.

According to a further embodiment, the measuring system further comprises a controller configured to control the noise source to successively provide a first noise signal and a second noise signal to the device under test, wherein the first noise signal has a lower noise temperature than the second noise signal, and wherein the measuring device is configured to determine the one or more of the amplification factor and the noise figure of the device under test by successively measuring the measuring signal while the noise source provides the first noise signal to the device under test and while the noise source provides the second noise signal to the device under test. A specially accurate measurement of the amplification factor and the noise figure is thereby possible.

According to a further embodiment, the measuring device further comprises a first local oscillator, a first mixer, and a second mixer. The first local oscillator is configured to provide a first local oscillator signal to the first mixer and to the second mixer. The signal splitter is configured to provide the first split measuring signal to the first mixer, and to provide the second split measuring signal to the second mixer. The first mixer is configured to mix the first split measuring signal with the first local oscillator signal to generate a first intermediate frequency signal. The second mixer is configured to mix the second split measuring signal with the first local oscillator signal to generate a second intermediate frequency signal. It is thereby possible to generate two intermediate frequency signals, which are identical except for noise added by the measuring setup.

According to a further embodiment, the measuring device comprises an I/Q-demodulator, including a first I/Q-demodulator and a second I/Q-demodulator. The first I/Q-demodulator is configured to perform an I/Q-demodulation of the first intermediate frequency signal to generate a first demodulated signal, comprising a first demodulated I-signal and a first demodulated Q-signal. The second I/Q-demodulator is configured to perform an I/Q-demodulation of the second intermediate frequency signal to generate a second demodulated signal, comprising a second demodulated I-signal and a second demodulated Q-signal. By separately demodulating the intermediate frequency signals using the same second local oscillator signal, the resulting demodulated signals are kept identical except for the noise added by the measuring setup.

According to a further embodiment, the I/Q-demodulator comprises a second local oscillator and a phase shifter, wherein the first I/Q-demodulator comprises a third mixer and a fourth mixer, and wherein the second I/Q-demodulator comprises a fifth mixer and a sixth mixer. The second local oscillator is configured to generate a second local oscillator signal and provide it to the phase shifter. The phase shifter is configured to provide a 0° phase shifted second oscillator signal to the third mixer and the fifth mixer. The phase shifter is configured to provide a −90° phase shifted second oscillator signal to the fourth mixer and the sixth mixer. The third mixer is configured to generate the first demodulated I-signal. The fourth mixer is configured to generate the first demodulated Q-signal. The fifth mixer is configured to generate the second demodulated I-signal. The sixth mixer is configured to generate the second demodulated Q-signal. It is thereby possible to further keep the signals of the two measuring branches identical except for the noise added by the measuring setup.

According to a further embodiment, the measuring device comprises a first analog-digital-converter, a second analog-digital-converter, a third analog-digital-converter, and a fourth analog-digital-converter. The third mixer is configured to provide the first demodulated I-signal to the first analog-digital-converter. The fourth mixer is configured to provide the first demodulated Q-signal to the second analog-digital-converter. The fifth mixer is configured to provide the second demodulated I-signal to the third analog-digital-converter. The sixth mixer is configured to provide the second demodulated Q-signal to the fourth analog-digital-converter. The first analog-digital-converter is configured to digitize the first demodulated I-signal to generate a digital first demodulated I-signal. The second analog-digital-converter is configured to digitize the first demodulated Q-signal to generate a digital first demodulated Q-signal. The third analog-digital-converter is configured to digitize the second demodulated I-signal to generate a digital second demodulated I-signal. The fourth analog-digital-converter is adapted to digitize the second demodulated Q-signal to generate a digital second demodulated Q-signal. It is thereby further possible to keep the resulting signals of the two measuring paths identical except for the noise added by the measuring setup.

According to a further embodiment, the measuring device further comprises a first adder and a second adder. The first adder is configured to add the digital first demodulated I-signal and the digital first demodulated Q-signal to generate the signal derived from the first split measuring signal. The second adder is configured to add the digital second demodulated I-signal and the digital second demodulated Q-signal to generate the signal derived from the second split measuring signal.

In accordance with further example embodiments, a measuring method is provided. The measuring method comprises providing a noise signal to a device under test, by a noise source, and measuring a measuring signal generated by the device under test in reaction to the noise signal, by a measuring device. The method further comprises splitting the measuring signal into at least a first split measuring signal and a second split measuring signal, by the measuring device, correlating a signal derived from the first split measuring signal and a signal derived from the second split measuring signal, by the measuring device, and determining an amplification factor and/or a noise figure of the device under test based upon the correlated signal derived from the first split measuring signal and the signal derived from the second split measuring signal, by the measuring device. It is thereby possible to significantly reduce the effect of noise added by the measuring setup. A significantly increase in measured accuracy can thereby be reached.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

Approaches for a measuring device and measuring method that allow for a very accurate measurement of the noise figure and amplification of a device under test, independent of the power of the measuring signal, are described. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Figure 1:
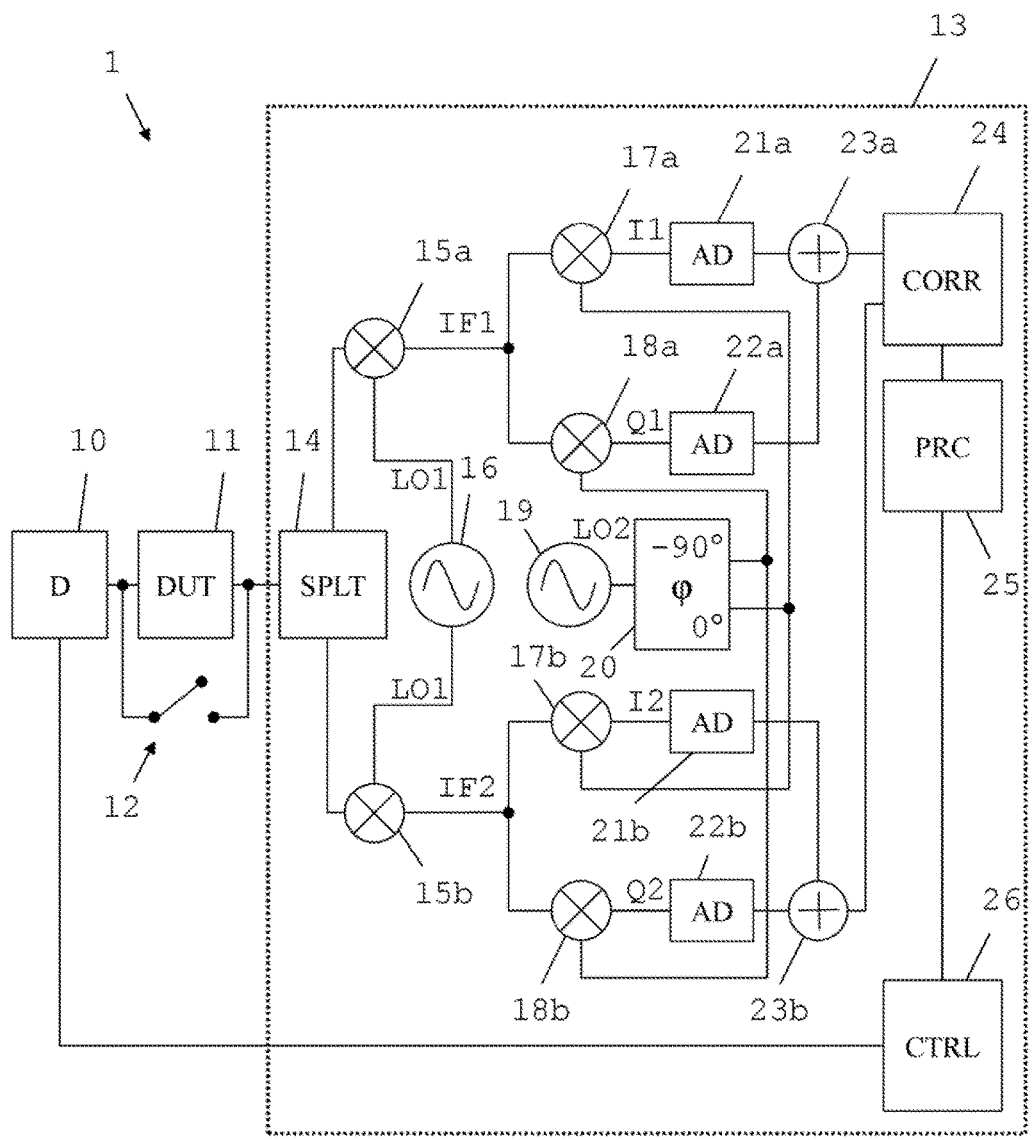
FIG. 1 illustrates a block diagram of a measuring system in accordance with an example embodiment of the present invention.

FIG. 1 illustrates a block diagram of a measuring system 1 in accordance with an example embodiment of the present invention. According to the embodiment of FIG. 1, the measuring system 1 comprises a noise source, such as diode 10 (e.g., an Enhanced Noise Ratio diode (ENR-diode)). The diode 10 is connected to a device under test (DUT) 11, which is not a part of the measuring system. Further, the measuring system 1 comprises a switch 12 for bypassing the device under test 11.

The device under test 11 is connected to a measuring device 13. By way of example, the device under test 11 is connected to a signal splitter 14, which in turn is connected to a first mixer 15a and a second mixer 15b. Each of the mixers 15a, 15b is connected to a first local oscillator 16. An output of the mixer 15a is connected to one input of each of two further mixers 17a, 17b, and an output of the mixer 15b is connected to one input of each of two further mixers 18a, 18b. A second input of each of the mixers 17a, 17b, 18a, 18b is connected to a phase shifter 20, which is connected to a second local oscillator 19. The outputs of each of the mixers 17a, 17b, 18a, 18b is connected to the input of a respective one of the analog-to-digital (A/D) converters 21a, 21b, 22a, 22b. The outputs of the A/D converters 21a and 22a are connected to an adder 23a. The outputs of the A/D converters 21b and 22b are connected to an adder 23b. The outputs of the adders 23a and 23b are connected to a correlator 24, which in turn is connected to a processor 25. The processor 25 is connected to a controller 26, which is connected to the diode 10.

The mixers 17a, 18a constitute a first I/Q-demodulator, while the mixers 17b, 18b constitute a second I/Q-demodulator. The first and second I/Q-demodulators and the second local oscillator 19 and the phase shifter 20 constitute a I/Q-demodulator.

For performing a measurement of one or more of an amplification factor and a noise figure of the device under test 11, the controller 26 instructs the noise source 10 to successively emit a first noise signal and a second noise signal, the first noise signal having a lower noise temperature than the second noise signal. The device under test receives the noise signal and outputs a measuring signal in response.

The measuring signal is split by the signal splitter 14 into a first split measuring signal, which is provided to the mixer 15a and a second split measuring signal which is provided to the mixer 15b. The local oscillator 16 generates a first local oscillator signal LO1 and provides it to the mixers 15a and 15b. The mixers 15a, 15b mix the first and second split measuring signal with a first local oscillator signal LO1 and thereby generate a first and second intermediate frequency signal IF1, IF2.

The first intermediate frequency signal IF1 is provided to the first I/Q-demodulator, and the second intermediate frequency signal IF2 is provided to the second I/Q-demodulator. The phase shifter 20 provides a second local oscillator signal LO2, which is phase shifted by 0° degrees (e.g., is not phase shifted) to the mixers 17a and 17b. The mixers 17a, 17b then mix the respective intermediate frequency signals IF1, IF2 with the non-phase shifted second local oscillator signal LO2, resulting in a first demodulated I-signal I1 and a second demodulated I-signal I2. Further, the phase shifter 20 provides second local oscillator signal LO2, which is phase shifted by −90° to the mixers 18a, 18b. The mixers 18a, 18b mix the respective intermediate frequency signal IF1, IF2 with the −90° phase shifted second local oscillator signal LO2, resulting in a first demodulated Q-signal Q1 and a second demodulated Q-signal Q2.

The resulting signals I1, I2, Q1, Q2, are each handed to an A/D converter 21a, 21b, 22a, 22b, which digitize the signals. Output signals of the A/D converters 21a, 22a are handed to an adder 23a which adds the signals to form the signal derived from the first split measuring signal. The output signals of the A/D converters 21b, 22b are handed to adder 23b, which adds the signals to a signal derived from the second split measuring signal. The output signals of the adders 23a, 23b are handed to the correlator 24, which performs a correlation of these signals. Thereby, non-matching signal components, which correspond to noise added by the measuring setup (e.g., the measuring device 13) are thereby removed. After this, a single resulting measuring signal is handed to the processor 25, which determines the amplification factor and/or noise figure of the device under test 11.

In this example embodiment, a splitting of the measuring signal into two measuring branches is shown. According to further embodiments, the measuring signal may be split into a larger number of measuring paths, whereby more than two signals are correlated. This can further reduce the noise components introduced by the measuring setup within the correlated signal.

Moreover, since this measuring setup does not use a pre-amplifier, an ideal impedance matching at the output of the device under test 11 is possible, which significantly reduces the effect of the actual power level of the measuring signal.

Figure 2:
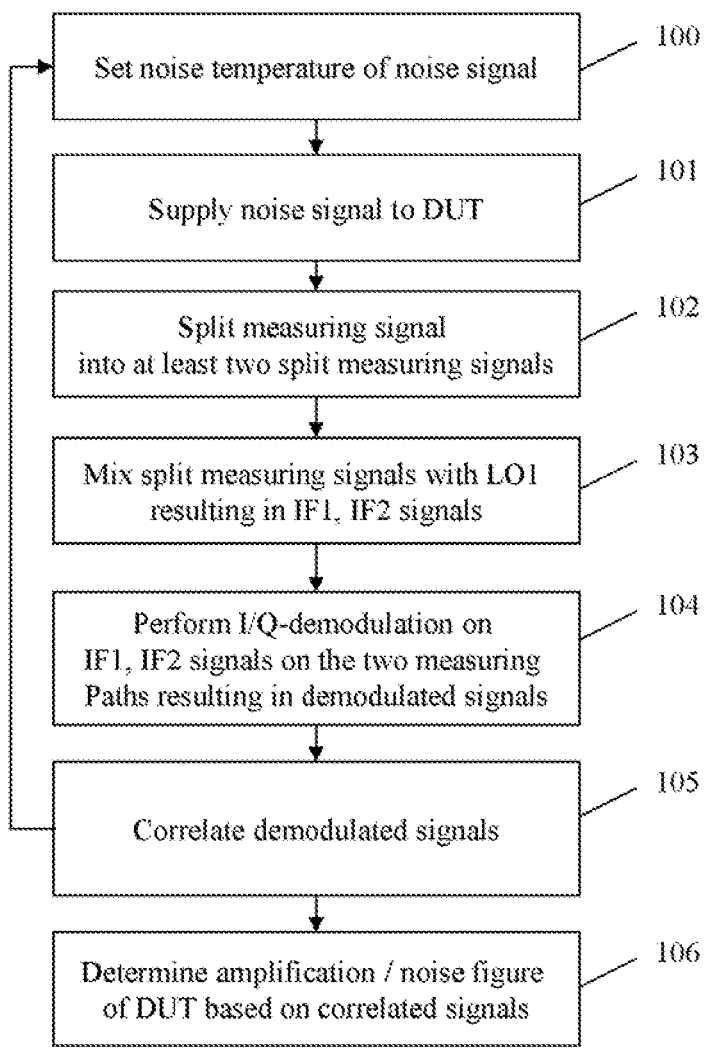
FIG. 2 depicts a flow chart illustrating a measurement process in accordance with example embodiments of the present invention.

FIG. 2 depicts a flow chart illustrating a measurement process in accordance with example embodiments of the present invention. In a first step 100, a noise temperature of a noise signal is set. By way of example, in a third step 102, the noise temperature is set to a first lower noise temperature. In a second step 101, the noise signal is supplied to a device under test. A resulting measuring signal is split into at least two split measuring signals. In a fourth step 103, each of the split measuring signals is mixed with an identical first local oscillator signal resulting in at least two intermediate frequency signals. In a fifth step 104, an I/Q-demodulation of the at least two intermediate frequency signals on the two measuring paths is performed. This results in at least two demodulated signals. In a sixth step 105, the demodulated signals are correlated. By way of example, during the correlation step, signal components, which are not identical within the demodulated signals are removed. It is thereby possible, to remove noise components introduced by the measuring setup. According to a further embodiment, the demodulated signals are first digitized before being correlated. In a seventh step 106, one or more of an amplification factor and a noise figure of the device under test is/are determined based upon the correlated signals. According to a further embodiment, after performing the sixth step, it is possible to return to the first step 100 and continue with a different noise temperature.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A measuring system comprising:
a noise source configured to provide a noise signal to a device under test; and
a measuring device configured to measure a measuring signal generated by the device under test in response to the noise signal; and
wherein the measuring device comprises a signal splitter, a first local oscillator, a first mixer, a second mixer, an I/Q-demodulator including a first I/Q-demodulator and a second I/Q-demodulator, a correlator, and a processor,
wherein the signal splitter is configured to split the measuring signal into at least a first split measuring signal and a second split measuring signal and to provide the first and second split measuring signals to the first and second mixers, respectively, wherein the first local oscillator is configured to generate a first local oscillator signal and to provide the first local oscillator signal directly to both the first mixer and the second mixer, wherein the first mixer is configured to generate a first intermediate frequency signal based on the first split measuring signal and the first local oscillator signal, and the second mixer is configured to generate a second intermediate frequency signal based on the second split measuring signal and the first local oscillator signal, wherein the first I/Q-demodulator is configured to perform an I/Q-demodulation of the first intermediate frequency signal to generate a first demodulated signal, comprising a first demodulated I-signal and a first demodulated Q-signal, and the second I/Q-demodulator is configured to perform an I/Q-demodulation of the second intermediate frequency signal to generate a second demodulated signal, comprising a second demodulated I-signal and a second demodulated Q-signal, wherein the correlator is configured to correlate a signal derived from the first demodulated signal and a signal derived from the second demodulated signal to generate a correlated signal, and wherein the processor is configured to determine one or more of an amplification factor and a noise figure of the device under test based on the correlated signal.

2. The measuring system of claim 1, wherein the measuring device further comprises:
a controller configured to control a noise temperature of the noise signal generated by the noise source.

3. The measuring system of claim 1, wherein the noise source comprises a diode.

4. The measuring system of claim 1, wherein the measuring system further comprises a switch configured to bypass the device under test.

5. The measuring system of claim 1, wherein the measuring system is configured to measure the one or more of the amplification factor and the noise figure of the device under test based on a Y-method.

6. The measuring system of claim 1, further comprising:
a controller configured to control the noise source to successively provide a first noise signal and a second noise signal to the device under test, wherein the first noise signal includes a lower noise temperature than the second noise signal, and wherein the measuring device is configured to determine the one or more of the amplification factor and the noise figure of the device under test by successively measuring the measuring signal while the noise source provides the first noise signal to the device under test and while the noise source provides the second noise signal to the device under test.

7. The measuring system of claim 1, wherein the first mixer is configured to mix the first split measuring signal with the first local oscillator signal to generate the first intermediate frequency signal, and wherein the second mixer is configured to mix the second split measuring signal with the first local oscillator signal to generate the second intermediate frequency signal.

8. The measuring system of claim 1, wherein the I/Q-demodulator comprises:
a second local oscillator and a phase shifter, wherein the first I/Q-demodulator comprises a third mixer and a fourth mixer, and wherein the second I/Q-demodulator comprises a fifth mixer and a sixth mixer; and wherein the second local oscillator is configured to generate a second local oscillator signal and provide it to the phase shifter, wherein the phase shifter is configured to provide a 0° phase shifted second oscillator signal to the third mixer and the fifth mixer, wherein the phase shifter is configured to provide a −90° phase shifted second oscillator signal to the fourth mixer and the sixth mixer, wherein the third mixer is configured to generate the first demodulated I-signal, wherein the fourth mixer is configured to generate the first demodulated Q-signal, wherein the fifth mixer is configured to generate the second demodulated I-signal, and wherein the sixth mixer is configured to generate the second demodulated Q-signal.

9. The measuring system of claim 8, wherein the measuring device further comprises:
a first analog-digital-converter, a second analog-digital-converter, a third analog-digital-converter, and a fourth analog-digital-converter; and wherein the third mixer is configured to provide the first demodulated I-signal to the first analog-digital-converter, wherein the fourth mixer is configured to provide the first demodulated Q-signal to the second analog-digital-converter, wherein the fifth mixer is configured to provide the second demodulated I-signal to the third analog-digital-converter, wherein the sixth mixer is configured to provide the second demodulated Q-signal to the fourth analog-digital-converter, wherein the first analog-digital-converter is configured to digitize the first demodulated I-signal to generate a digital first demodulated I-signal, wherein the second analog-digital-converter is configured to digitize the first demodulated Q-signal to generate a digital first demodulated Q-signal, wherein the third analog-digital-converter is configured to digitize the second demodulated I-signal to generate a digital second demodulated I-signal, and wherein the fourth analog-digital-converter is adapted to digitize the second demodulated Q-signal to generate a digital second demodulated Q-signal.

10. The measuring system of claim 9, wherein the measuring device further comprises:
a first adder and a second adder; and wherein the first adder is configured to add the digital first demodulated I-signal and the digital first demodulated Q-signal to generate the signal derived from the first split measuring signal, and wherein the second adder is configured to add the digital second demodulated I-signal and the digital second demodulated Q-signal to generate the signal derived from the second split measuring signal.

11. A measuring method comprising:
providing a noise signal to a device under test;
measuring a measuring signal generated by the device under test in response to the noise signal;
generating, by a first local oscillator, a first local oscillator signal, and providing the first local oscillator signal directly to both a first mixer and a second mixer;
splitting the measuring signal into at least a first split measuring signal and a second split measuring signal, and providing the first and second split measuring signals to the first and second mixers, respectively;

generating a first intermediate frequency signal based on the first split measuring signal and the first local oscillator signal and a second intermediate frequency signal based on the second split measuring signal and the first local oscillator signal;

performing an I/Q-demodulation of the first intermediate frequency signal to generate a first demodulated signal, comprising a first demodulated I-signal and a first demodulated Q-signal;

performing an I/Q-demodulation of the second intermediate frequency signal to generate a second demodulated signal, comprising a second demodulated I-signal and a second demodulated Q-signal; and correlating a signal derived from the first demodulated signal and a signal derived from the second demodulated signal to generate a correlated signal; and determining one or more of an amplification factor and a noise figure of the device under test based on the correlated signal.

12. The measuring method of claim 11, wherein the measuring method further comprises:
controlling a noise temperature of the noise signal generated by the noise source, by the measuring device.

13. The measuring method of claim 11, wherein the measuring method further comprises:
measuring the one or more of the amplification factor and the noise figure of the device under test using a Y-method.

14. The measuring method of claim 11, wherein the measuring method further comprises:
successively providing a first noise signal and a second noise signal to the device under test, wherein the first noise signal has a lower noise temperature than the second noise signal; and
determining the one or more of the amplification factor and the noise figure of the device under test by successively measuring the measuring signal while the noise source provides the first noise signal to the device under test and while the noise source provides the second noise signal to the device under test.

15. The measuring method of claim 11, wherein the measuring method further comprises:
mixing the first split measuring signal with the first local oscillator signal to generate the first intermediate frequency signal; and
mixing the second split measuring signal with the first local oscillator signal to generate the second intermediate frequency signal.

16. The measuring method of claim 11, wherein the measuring method further comprises:
generating the first demodulated I-signal based on a 0° phase shifted second oscillator signal;
generating the first demodulated Q-signal based on a −90° phase shifted second oscillator signal;
generating the second demodulated I-signal based on a 0° phase shifted second oscillator signal; and
generating the second demodulated Q-signal based on a −90° phase shifted second oscillator signal.

17. The measuring method of claim 16, wherein the measuring method further comprises:
digitizing the first demodulated I-signal to generate a digital first demodulated I-signal;
digitizing the first demodulated Q-signal to generate a digital first demodulated Q-signal;
digitizing the second demodulated I-signal to generate a digital second demodulated I-signal; and
digitizing the second demodulated I-signal to generate a digital second demodulated Q-signal, by the fourth analog-digital-converter.

18. The measuring method of claim 17, wherein the measuring method further comprises:
adding the digital first demodulated I-signal and the digital first demodulated Q-signal to generate the signal derived from the first split measuring signal; and
adding the digital second demodulated I-signal and the digital second demodulated Q-signal to generate the signal derived from the second split measuring signal.

* * * * *